UNITED STATES PATENT OFFICE.

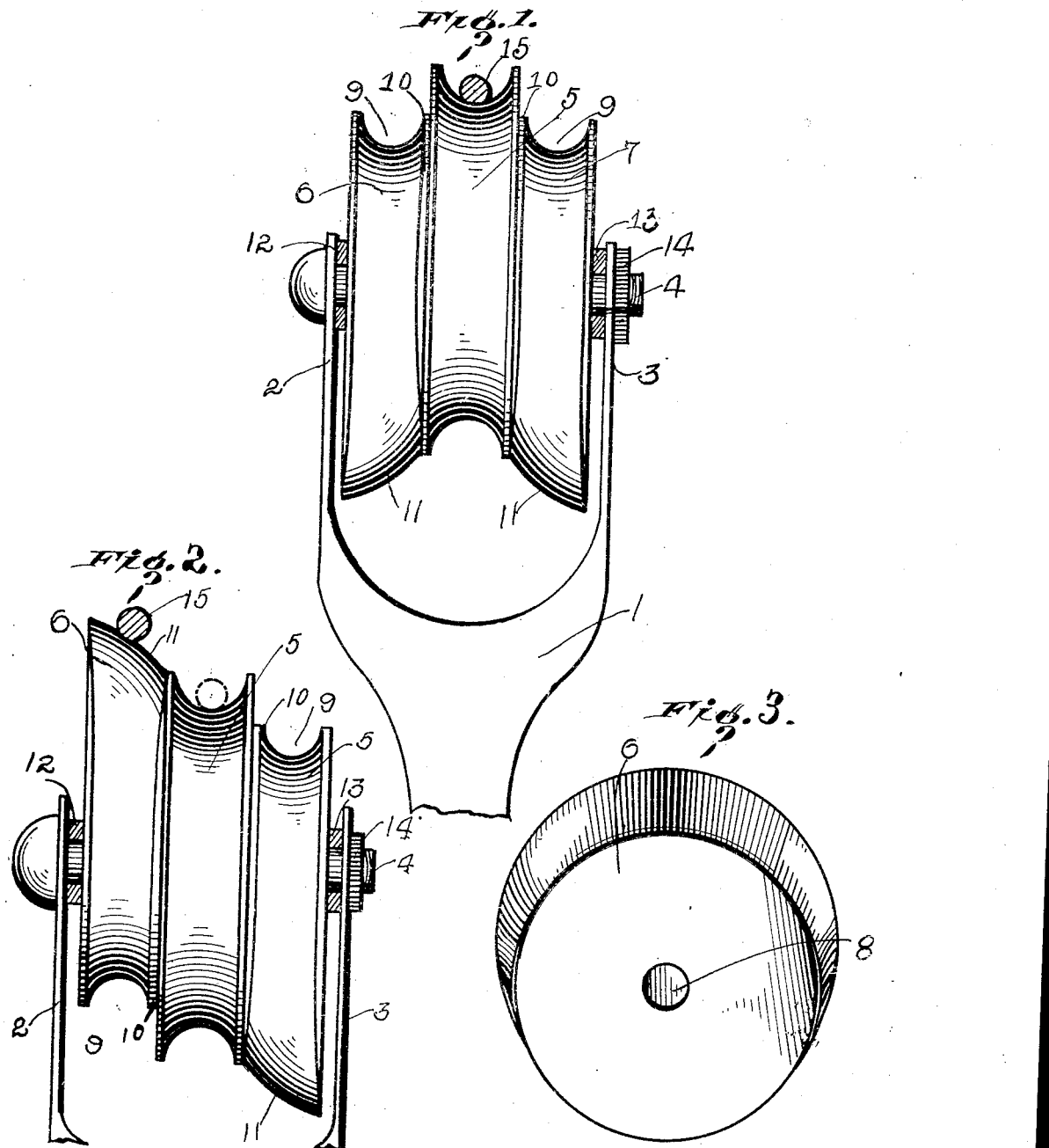

JOHN W. PENNELL, OF YOUNGSTOWN, OHIO.

TROLLEY-WHEEL.

1,039,589.

Specification of Letters Patent.

Patented Sept. 24, 1912.

Application filed August 24, 1910. Serial No. 578,614.

*To all whom it may concern:*

Be it known that I, JOHN W. PENNELL, a citizen of the United States of America, residing at Youngstown, in the county of Mahoning and State of Ohio, have invented certain new and useful Improvements in Trolley-Wheels, of which the following is a specification, reference being had therein to the accompanying drawing.

This invention relates to trolley wheels and the principal object thereof is to provide a device which will return the wire to the wheel when it slips off. It is also desired to prevent any danger of the wire becoming jammed between the outside wheels and the central wheel.

This improved wheel is illustrated in the accompanying drawings, wherein—

Figure 1 is a view showing the normal position of the three wheels. Fig. 2 is a view showing one of the side wheels in a position to return the trolley wire to the central wheel. Fig. 3 is a view of one of the side wheels removed from the axle.

In the accompanying drawings, 1 indicates the harp of the trolley pole which is provided with the usual arms 2 and 3 in the ends of which is mounted an axle 4. A central grooved wheel 5 and side wheels 6 and 7 are mounted upon the axle 4. The central wheel is provided with an opening passing through the center while the wheels 6 and 7 are each provided with an opening 8 which is off the center, as shown in Fig. 3, for a purpose to be brought out hereinafter.

Each of the side wheels is provided with a groove 9 which is provided at its inner edge with an abutment wall 10. The groove gradually decreases in depth until it terminates in an outwardly curved portion 11, the inner edge of which is level with the edge of the wheel 5. The wheels are held spaced apart from the sides of the harp by means of the washers 12 and 13, and the axle is held in place by the nut 14.

The operation of the device is as follows: In operation the wire 15 is normally held within the groove of the wheel 5; if by accident said wire should get out of the groove, it will fall within the groove of one of the wheels 9 which in normal position is uppermost. By having the wall 10 there is no danger of the wire being jammed between the side of the wheel 5 and the side wheel. When the wire gets into groove 9, it causes the wheel to turn until it assumes the position shown in Fig. 2. In this position, the wire can easily roll back into the groove of the central wheel 5, and there is no danger of its becoming jammed. When the wire goes back onto the wheel 5, the weight of the enlarged portion 11 and the fact that the wheel is mounted off the center causes it to return to the original position shown in Fig. 1.

What I claim as my invention is:

The combination with a trolley wheel of a replacing wheel on each side thereof, mounted on a common axis, said replacing wheels having the same diameter as the trolley wheel, each being mounted eccentrically on the axis, each of said replacing wheels having a peripheral groove extending from the median line at the short side thereof and merging at the longer side into the face adjacent the trolley wheel, at a point flush with the periphery of the latter.

In testimony whereof I hereunto affix my signature in presence of two witnesses.

JOHN W. PENNELL.

Witnesses:
 B. K. DE CAMP,
 J. P. DE CAMP.